United States Patent [19]

Robinson et al.

[11] 4,428,052
[45] Jan. 24, 1984

[54] NAVIGATIONAL AID AUTOPILOT

[75] Inventors: Eugene A. Robinson; Jerry L. Setliff, both of Dallas; Michael D. Smith, Plano; John P. Volpi, Dallas, all of Tex.

[73] Assignee: Texas Instruments Incorporated, Dallas, Tex.

[21] Appl. No.: 271,914

[22] Filed: Jun. 9, 1981

[51] Int. Cl.³ .................................... G06F 15/50
[52] U.S. Cl. .................... 364/436; 364/444; 364/450; 364/457
[58] Field of Search ............... 364/178, 179, 436, 444, 364/447, 450, 452, 457; 343/5 MM, 103, 112 PT; 318/588

[56] References Cited

U.S. PATENT DOCUMENTS

| | | | |
|---|---|---|---|
| 3,148,542 | 9/1964 | Clift, Jr. | 73/308 |
| 3,195,073 | 7/1965 | Penn | 332/45 |
| 3,630,079 | 12/1971 | Hughes et al. | 73/178 |
| 3,643,254 | 2/1972 | Proebsting | 340/347 DD |
| 3,715,572 | 2/1973 | Bennett | 364/436 X |
| 3,757,308 | 9/1973 | Fosdick | 364/200 |
| 3,771,483 | 11/1973 | Bond | 364/444 X |
| 3,787,673 | 1/1974 | Watson et al. | 364/736 |
| 3,875,571 | 4/1975 | Davis, Jr. et al. | 343/6.5 R |
| 3,953,849 | 4/1976 | Couvillon | 343/7 A |
| 4,099,259 | 7/1978 | Parsons et al. | 364/900 |
| 4,134,117 | 1/1979 | Robinson et al. | 343/103 |
| 4,142,245 | 2/1979 | Baron | 364/900 |
| 4,144,571 | 3/1979 | Webber | 364/450 |
| 4,181,943 | 1/1980 | Mercer, Sr. et al. | 364/436 X |
| 4,209,836 | 6/1980 | Wiggins, Jr. et al. | 364/718 |
| 4,236,215 | 11/1980 | Callahan et al. | 364/436 |
| 4,253,149 | 2/1981 | Cunningham et al. | 364/444 |
| 4,301,506 | 11/1981 | Turco | 364/436 |

Primary Examiner—Jerry Smith
Attorney, Agent, or Firm—Alva H. Bandy; N. Rhys Merrett; Melvin Sharp

[57] ABSTRACT

A navigational aid and autopilot in which informational data pertaining to the physical operating conditions of the craft, the external characteristics relevant to the operation of the craft, and a chart mapping a selected portion of the surface of the earth in which the craft is operating are combined into a single communication correlating such data in a manner assisting an operator of the craft in the performance of his duties. The navigational aid measures external physical conditions such as radio transmissions, radar soundings, sonar soundings, and the like, as well as the physical state of the craft such as fuel flow, list of the craft, and speed of the motor. By monitoring these characteristics in association with an electronic chart, the system correlates and combines the total informational content in a comprehensive form so as to relieve the operator pilot of the necessity of integrating and correlating data from a plurality of different sources. The autopilot operation accepts two types of data command, the first being a destination, the second being a bearing and time duration. Through the use of a position determining means, such as a Loran-C receiver, the system controls the craft and its movement to the destination. With the help of the external physical condition monitors, the system provides course direction so that the craft will not collide with another boat nor run aground. The autopilot additionally plots the course for the craft.

21 Claims, 18 Drawing Figures

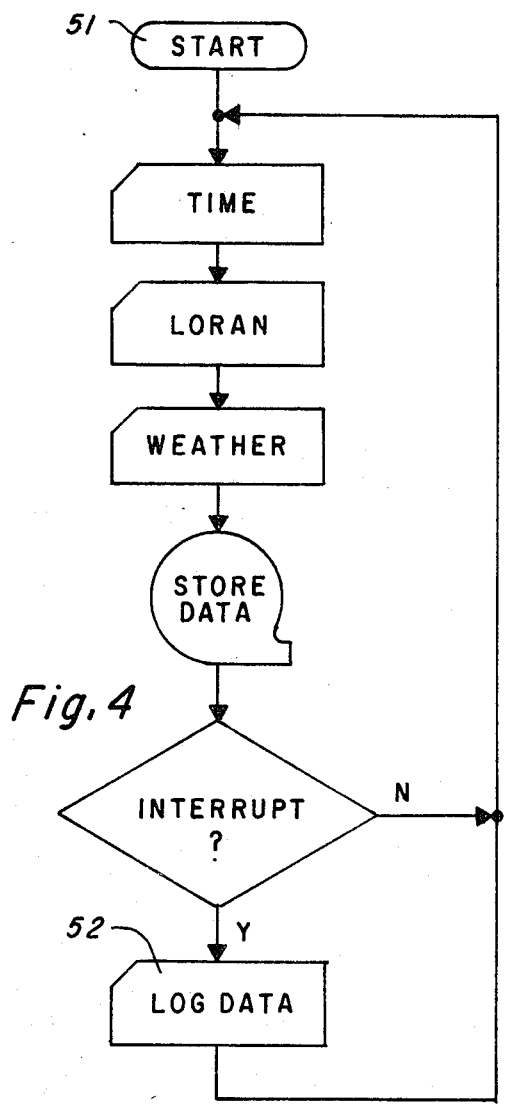
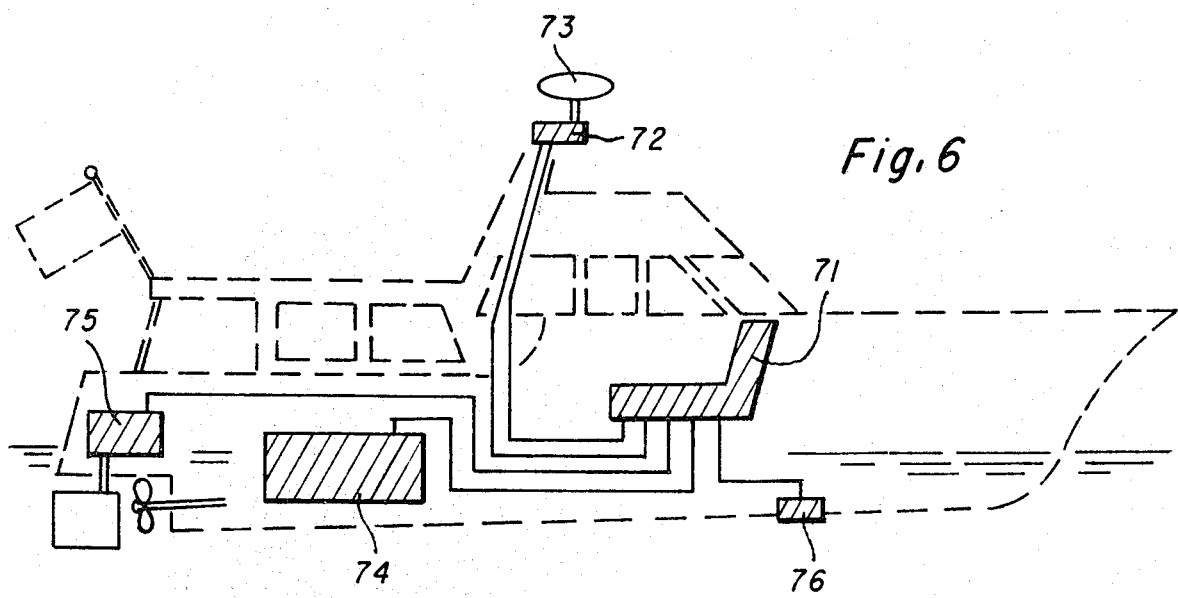

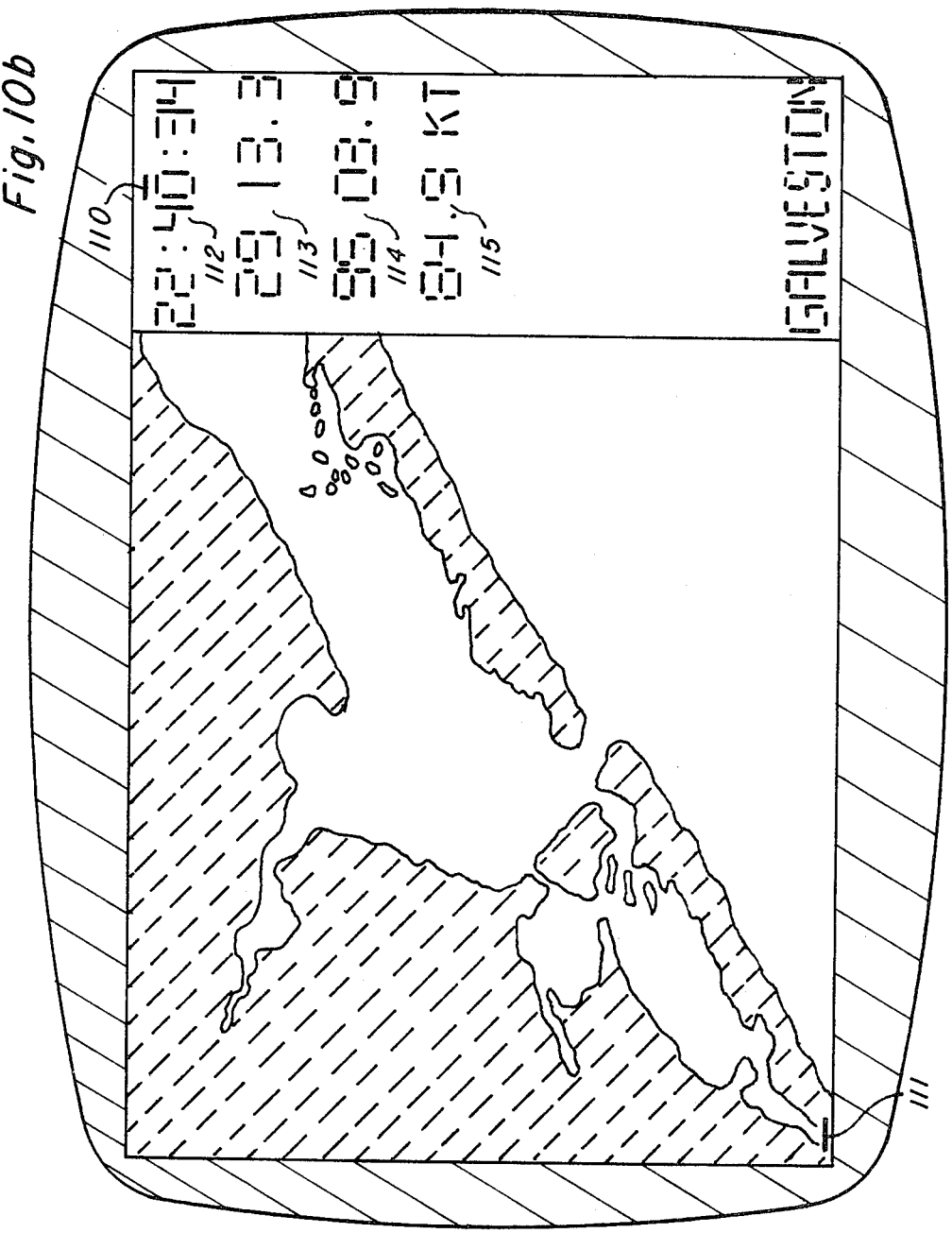

NAVIGATIONAL AID AUTOPILOT

BACKGROUND OF THE INVENTION

This invention relates to navigational aids and operational aids for utilization in a marine environment.

Related copending applications and filed contemporaneously are Ser. No. 271,902 entitled IMPROVED RADAR SYSTEM, Ser. No. 271,917 entitled NAVIGATION AID AND METHOD OF OPERATING THE SAME, Ser. No. 271,918 entitled ELECTRONIC CHART SYSTEM, and Ser. No. 271,915 entitled METHOD AND APPARATUS FOR AUTOMATIC DISTRESS CALL SIGNAL TRANSMISSION.

As the waterways of the world become more congested by the presence of ever larger numbers of vessels thereon due to the increased volume of trade being conducted via such waterways, the need for operational and navigational aids for these vessels is heightened. This need is further enhanced by the complexity and size of the vessels being used today. The aids are used to warn of dangerous conditions in the external environment such as other vessels, islands, or weather conditions. Examples of these aids are radar, sonar, and radio transmitters. Additionally, aids exist for assistance in the operation of the vessel, these aids communicating to the operator various informational data so that the vessel is maintained in proper operating condition. These types of operational aids include knot meters, flow meters, motor speed monitors, and the like.

In an effort to make the waterways more efficient and safe, numerous regulations and statutes have been enacted which require certain instruments and aids to be incorporated on the vessel depending on its class. Generally, as the vessel increases in size and complexity, the amount of required instrumentation additionally increases. These regulations have been developed and are maintained so as to prevent collisions and to facilitate the efficient movement of vessels within a waterway.

It is obvious that a collision between two vessels has a dramatic impact upon the economics, human life, and the environment in which the collision occurs. A rupture of a super tanker makes instant national and international news due to impact.

To prevent such collisions and to comply with the marine regulations, the vessel is equipped with sundry electronic and nonelectronic instruments so as to appraise the operator of the condition within and without the ship. These instruments are typically independent of each other and perform as stand-alone mechanisms. The data supplied by each instrument is raw and not correlated to the other conditions which are being measured. For example, the radar equipment should be monitored for approaching vessels or land masses; this monitoring requires constant surveillance by the operator.

Numerous devices additionally need mundane but constant monitoring so that a particular situation will not get out of hand.

Some of the electronic instruments which are used include radar, sonar, and the autopilot controls which are stand-alone systems and operate completely independent, one from the other. The data from each must be manually cross-matched.

Nonelectronic apparatuses are also used in the operation of the vessel; such as paper charts, clocks, and logs. In operation, the pilot needs to obtain these charts and match the data contained therein to the electronic instrument data being communicated. Additionally, at discrete time intervals, typically every four hours, the operator must enter selected data into the logs so that the operation of the craft may be later analyzed. These logs additionally provide another benefit in that their data will assist such industries as the fishing industry to relocate fruitful fishing zones.

It is clear therefore, that the number of such instruments within the cockpit has been increasing so as to create severe space limitations upon further additions thereto. To perform its operations, each instrument contains similar, if not identical, components to components of the other instruments, such as a microcomputer or other control means, for example. This duplication results in a much higher cost, space, and power for the overall aggregation of independent instruments maintained on a vessel as navigational and operational aids.

A much higher concern exists in the possible overwhelming of the operator by the amount of incoming raw data from each individual independent instrument system. Much of this data may be of critical importance and should be monitored and assimilated by the operator so that its significance is made apparent.

The sheer number of instruments within the cockpit which must be correlated, that is the data from one instrument matched with data from other instruments to determine the relative significance thereof, also reduces the operator's efficiency in handling this flood of raw data.

SUMMARY OF THE INVENTION

This invention provides a navigational and/or operational aid for use in a craft, such as a vessel, enabling an operator to accomplish automatic correlation of independently retrieved data relating to the operation of the craft, wherein any routine monitoring of the data is automatically performed without requiring the immediate attention of the operator. The navigational and/or operational aid improves the efficiency of the operator who is then less likely to make routine errors, thereby reducing the possibility of collision or mismanagement of the craft dramatically. Particular data is more susceptible to combination than other dta; some data does not require the constant surveillance of the operator since its status does not change dramatically in time but is relatively static.

The numerous components and subassemblies of this invention are generally categorize under the respective subheadings which follow; those skilled in the art will recognize that characteristics of one category are generally extendable to the other categories. The subheadings are therefore to be used solely for reference purposes and not as limitations.

NAVIGATIONAL AID

As noted earlier, two types of data are of particular importance. This data includes the status of external physical conditions (e.g., weather or position of other vessels) and selected internal physical states of the craft (e.g. motor speed, or autopilot control).

This external physical condition and the internal physical state of the craft are combined on an electronic chart or other such map giving a representation of the surface characteristics of the locale of the craft. The data from these three sources (external conditions, internal state, and chart) is combined to form a single combination or representation which is communicated to the operator or user. As an example only, the position of another craft relative to the subject vessel is illustrated on an electronic chart to give their relative positions; this is correlated together with the data from the internal state as to the speed of the vessel to cross check if a collision will occur.

Hence, the representation showing the relative positions of all the crafts, together with their speed efficiently communicates to the operator in a single visual representation the situation without the need for operator interpolation or cross referencing the data from each source. The data of this invention far exceeds the informational content of the sum of its parts since the three independent data by and of themselves cannot communicate the situation without operator intervention.

Another characteristic of the invention is that the mundane task of operational log entry is removed from the operator. At selected periods of time, data from a position instrument, (i.e. a Loran-C receiver) is automatically stored on a nonvolatile data storage means (i.e., a tape cassette) together with the time, vessel speed, and heading entry. At the time of alert also, an entry is automatically entered into the log.

A permanent operational log is thereby created recording the position and other relevant conditions. The magnetic tape, cassette or other nonvolatile data storage means is susceptible to subsequent evaluation due to its digital nature.

Selective other conditions may be automatically entered upon the operational log such as speed, course, and the like. The invention preferably allows the operator to enter other data of concern such as quantity of fish taken, or weather conditions.

Upon return to home port, the magnetic tape cassette, is removed from the craft and is stored for future use or for analysis as to location and conditions encountered during the operation of the craft; this allows the operator to immediately determine the appropriate course bearing or location to take to return to a particular favorable spot so as to capitalize on current or fishing conditions.

Preferably the position determining means (such as a Loran-C receiver) together with the data storage means (magnetic tape cassette) are combined with an autopilot type device. This allows the craft to be completely piloted merely by insertion of the magnetic tape. Some control means, such as a microprocessor, correlates the position to the instructions on the cassette and makes the appropriate course changes.

The control means accepts either data which is descriptive of a chosen bearing, speed, and chosen duration, (i.e., a bearing of 350° for a time of two hours fourteen minutes at a speed of ten knots; alternatively the descriptive data defines the absolute position of the chosen destination (i.e., 24°, 14', 81°, 24', 19"). In the latter situation, the control means computes a bearing necessary to reach the destination and then appropriately directs the autopilot to obtain this bearing. By monitoring the position determining means, the control means is aware of the progress and any changes which must be made are determinable.

By adding an electronic chart ability, the control means additionally determines the components of a multi-leg course so as to avoid non-navigable area, such as an island.

It is important to note that the autopilot is electively either completely controlled by the data upon the magnetic tape cassette so as to repeat exactly a course and routine which has been particular favorable for the craft in question; or receives its instructions from the operator or any other sources.

RADAR SYSTEM

The invention is further enhanced through manipulation of radar data so that it is in a form and characterized with other data so as to facilitate operator analysis.

To this end, a radar apparatus with a visual display means is connected to the control means of the navigational aid. The control means accepts the data from the radar apparatus and transforms it according to the operator demands. The transformed data is communicated to the operator via the visual display means.

The operator's demands permit the center of transmission or datum to be artificially moved anywhere on or off the visual display. This provides a movable window so as to highlight and/or give higher resolution to a particular zone of interest. Additionally, the magnification of the visual representation is enhanceable so as to aid in the operator analysis of the zone of interest.

This artificial movement of the datum point or the enhancement capability is achievable since the radar soundings generate a significantly higher resolution than is typically displayable on a standard cathode ray tube. This sounding resolution is averaged out in normal operation; but is capitalized upon in movement of the window.

In this context, the control means accepts the electronic data from the radar apparatus, and magnifies or reduces the displayed visual representation as per the selected data relating thereto from the operator. The center or datum of the transmission is selectively movable to any point thereby providing a higher resolution, or to accentuate an area of interest.

As an example only, the area ahead of the craft may be heightened while the area behind the craft has a shortened or nonexistent visual representation. That is, the vision or window ahead is much greater than the vision behind the craft. In this way then, the operator is able to select an area of interest whether it be ahead, behind or to lateral sides of the craft which is of most concern to him at that time so that the data may be appropriately analyzed and reacted thereto by the operator.

The operator is permitted to label particular points of interest on the radar representation. The control means tracks this point and constantly updates the displayed label; this attribute permits ready marking of points or objects of interest such as a sister ship.

ELECTRONIC CHART

The system is digital in nature so as to facilitate matching of data from instruments or chart. An analog chart is particularly unsusceptible to automation for enlargement, storage, or display on a cathode ray tube (CRT). For this reason, a memory means containing a digital representation of the area of interest, whether it be the area in the locale of the craft or an area which is to be encountered by the craft, is connectable to the control means so that the chart, as per command of the operator, is displayable on a volatile display such as a CRT.

The electronic chart must be sufficient to define the particular characteristics which are of interest and which the craft is likely to encounter. For example, these characteristics for a marine vessel would include islands, land masses or navigation aids.

The actual resolution of the electronic map is operator manipulated so as to achieve the appropriate resolution according to the operator's whim. This allows particular areas, such as a port area, to be enlarged to allow expanded scrutiny.

One aspect of the electronic chart is its storage on a detachable nonvolatile storage means such as a magnetic tape. The detachable feature allows an extensive library to be carried. This is particularly useful for vessels which have extended trade routes. The detachable memory means are such mechanisms as a magnetic tape cassette, disk, or bubble memory.

The chart must be efficiently encoded so as to allow the most fruitful use of the memory means. The method of this invention is to divide the chart into a finite number of parallel scan levels; each of these scan levels is then encoded to indicate the changes in condition encountered within the particular scan level.

For marine purposes, two characteristics are to be defined by the chart; that is, whether a particular point within the chart is water or is land. An indication is made as to whether the scan level's origin is either land or water (i.e., "0" for land, "1" for water). The number of changes from water to land or vice-versa is then recorded. This data defines the number of "rays" or lengths within land exclusively or water exclusively. Each ray is further defined by a subsequent encoding as to the length of each ray. In this manner, the electronic chart is properly encoded to encompass a minimum number of storage areas and yet completely and finitely define the map.

Although the above example speaks in terms of land and water, it is intended that the method may be extendable to any other two conditions such as, but not limited to, changes in elevation, or international boundaries.

NAVIGATION AID AND METHOD OF OPERATION

The use of the electronic chart by the invention together with the position determining means, such as a Loran-C receiver, permits the two sets of data to be cross-referenced by the control means to indicate on the electronic chart the absolute position of the craft. In this fashion, the operator, at a glance, is able to ascertain whether the bearing or position of the craft, in relation to the surroundings, should be altered to avoid obstacles such as islands.

This eliminates the need for the operator to cross-reference the electronic feedout from the position determining means to the paper charts typically found on a marine vessel. The operator is therefore relieved of the tedious and time consuming task of determining his position relative to land masses and other points of interest. At a glance, and without mental manipulation, the operator is appraised of the immediate surroundings and their implications to the craft.

AUTOMATIC DISTRESS CALL

The invention further combines the control means with the position determining means, an electronic speech synthesis means, and a radio transmitter to create an automatic distress call apparatus. The automatic distress call apparatus allows an auditory "Mayday" message to be created which incorporates the actual position of the sinking craft and then transmits while the craft sinks. The control means obtains the position of the craft and creates a "Mayday" message or signal which is communicated via the electronic speech synthesis to the radio transmission means for transmission over the appropriate frequency for "Mayday" messages.

The apparatus is preferably enhanced by the addition of a means to monitor if the first or primary frequency used for "Mayday" messages is clear at the time of contemplated transmission. Should the channel not be clear, that is being used by another party, the apparatus transfers to a second selected frequency and transmits on that frequency until the first or primary frequency is clear; at that time the apparatus returns to the primary frequency and continues transmitting.

Preferably the control means has a means for determining the closest land based radio station or other appropriate receiver and utilizes this data to determine the preferable language in which the "Mayday" message is to be transmitted. The control means transmits the "Mayday" message in that language or any other language which has a probability of being received and therefore understood by a possible rescuer.

This apparatus allows the transmission to be triggered either by an operator or automatically by a severe change of state (i.e., fire), and to continue transmission to the very last possible moment or until deactivated by the operator. The transmission contains, in the relevant language, the absolute position of the craft in distress together with the call letters of the craft or any other information which would facilitate obtaining help.

DESCRIPTION OF THE INVENTION

The subheadings are added merely to assist the reader and are not to be taken as limiting or controlling upon the invention. The concepts, interconnection, and the like are intended to be freely associated between the subheadings.

NAVIGATIONAL AID/AUTOPILOT

The integration into the single system of this invention involving the various instruments and devices may be tailored to the specific needs of the craft. Functionally, the system involves a control means acting as the center of the system in that the control means receives and transmits information from the various sensors and instruments so as to correlate the total amount of data and thereby form a single communication to the operator.

The data received from such devices as the radar or Loran-C receiver is matched to the appropriate vessel internal physical state sensors, such as the flow meters or fathometer, so that their data, when matched together, provide a single message having informational content higher than the sum of their parts; this higher order information is obtained automatically, thereby relieving the operator from having to go through the inefficient and time consuming method of mentally correlating such data.

For example, the control means accepts data from its radar device indicating the presence or absence of various obstacles and land masses; this data is plotted onto the electronic map which is stored on a magnetic tape cassette. The two sets of data are represented in one single combination on a cathode ray tube or other such visual display means. Additionally, the control means accepts data from the knot meter indicating an internal physical state, then is matched to the electronic chart and the radar data to determine if a collision is imminent or if an evasive movement should be made.

Although the above example refers to the use of a radar unit as a means for measuring an external physical condition, a knot meter as a means for measuring a selected internal physical state of the craft, and a magnetic tape cassette as a means for storing a representation of the surface characteristics of the surface of the earth, together with a control means, it is contemplated that these devices may be altered at the will of the designer and user, allowing the overall system to take on any of the characteristics or functionality which is desired for the particular situation.

In this context the means for measuring the external physical condition may be such devices as a radio teletype, a sonar device, a single side band radio, a Loran-C receiver, or the like. The means for measuring selected internal physical states of the craft includes such devices as a digital compass, flow meters, volume meters, and the like.

The control means may be provided by any of numerous devices such as a TMS 9900 microprocessor available from Texas Instruments Incorporated of Dallas, Tex., or other such data processor which permits the forming of the combination from the data sets and subsequent communication. Other data processors include the data processor disclosed in U.S. Pat. No. 3,757,308 issued to Fosdick on Sept. 4, 1973, or U.S. Pat. No. 3,787,673 issued to Watson et al on Jan. 22, 1974, both of which are incorporated hereinto by reference.

The control means communicates to the operator via an operator interface. The operator interface takes on many forms and preferably includes a cathode ray tube as its principal means for displaying information. A keyboard may be added so as to permit the operator to selectively input data and commands which the control means utilizes. The encoding of the keyboard may take various forms including that disclosed in U.S. Pat. No. 3,643,254 issued to Proebsting on Feb. 15, 1972, incorporated hereinto by reference.

Certain commands and data must be entered by the operator for the control means to operate. An example of this data is the desired bearing and speed of the vessel, or which selected combinations of data are desired to be displayed.

In the preferred embodiment of the invention the operator interface is coupled to a means for speech synthesis so that any prompting or data which is communicated to the operator may be verbalized as audible synthesized speech via an auditory channel so as to relieve the operator of the need to maintain constant visual monitoring of the CRT to obtain his information. This permits the operator to move throughout the cockpit or in the near vicinity and still be cognizant of the data which is being generated by the control means. This auditory communication ability is particularly valuable for sounding alarms or warnings.

One such speech synthesis means is disclosed in U.S. Pat. No. 4,209,836 issued to Wiggins, Jr. et al on June 24, 1980, incorporated hereinto by reference.

One important advantage of this invention is its ability to operationally control the entire vessel, thus relieving the operator of the odius and monotonous task of monitoring all of the miscellaneous minor details associated with piloting a craft. To perform in this fashion, the invention incorporates an autopilot apparatus to the control means so that the control means has direct manipulative powers. The control means receives its instructions, whether they be data or commands, from some sort of storage means such as a random access memory (RAM), a read only memory (ROM), a magnetic tape machine or the like, or as a result of computation. One example is the storage system disclosed by U.S. Pat. No. 4,099,259 issued to Parsons et al on July 4, 1978, incorporated hereinto by reference.

The control means utilizes the data from the storage means to perform its autopilot task. Two types of data are preferably used in this context.

The first type of data indicates a direction or the bearing desired. The control means accepts the bearing data and correlates it to the digital compass in directing the operation of the autopilot.

The second type of data which is storable is a destination location. This destination may be described by its longitude or latitude or other such acceptable means. The control means utilizes this data together with the electronic map in establishing a feasible course between the point of origin and the point of destination possibly with operator assist. Multiple legs may have to be computed by the control means in its navigation of the craft.

In the preferred mode, the storage means is a magnetic tape cassette which permits the operator to insert the cassette having instructions sufficient to carry the ship on its designated course. The operator therefore is relieved of the necessity of computing courses, correlating to charts, determining the appropriate bearing of the ship and constantly monitoring the operation of the ship. In operation, the cassette is merely inserted into the system and the navigation of the vessel is automatically controlled.

In this task of navigating the ship from the point of origin to the point of destination, the progress is monitored through the use of a position determining means. The location as indicated by the position determining means is matched to the electronic map so as to maintain the control means aware of the position of the ship and its designated course. In this fashion, as the craft is pushed or wanders off course due to foul weather or simply to a drift, the control means automatically adjusts its course so that the appropriate destination is still achieved.

Some such position determining means may include that disclosed in U.S. Pat. No. 3,875,751 issued to Davis Jr. et al on Apr. 1, 1975, U.S. Pat. No. 3,630,079 issued to Hughes et al on Dec. 28, 1971, or U.S. Pat. No. 4,134,117 issued to Robinson et al on Jan. 9, 1979, all of which are incorporated hereinto by reference. The preferable position determining means is that of a Loran-C receiver similar to the device described in U.S. Patent issued to Robinson et al described above.

In the operation of the autopilot, the digital nature of the control means at various times is translated into a representative analog form so as to control such things as the rudder or other continuous operation type devices. One digital-to-analog (D/A) converter is disclosed in U.S. Pat. No. 4,142,245 issued to Baron on Feb. 27, 1979, incorporated hereinto by reference. Numerous devices also exist which will translate the analog position into a digital representation so that the control means is able to monitor its operation through feedback. These devices are typically referred to as analog-to-digital (A/D) converters which are well known in the art.

Numerous peripheral operations are preferbly monitored by the control means so as to relieve the operator of the odious burden of checking relatively stable conditions, but which must be kept track of during the operation of the vessel. These types of operations include the fuel level indicator, or revolutions per minute (RPM) of the motors. One such device which will measure the liquid level is disclosed in U.S. Pat. No. 3,148,542 issued to Clift Jr. on Sept. 15, 1964, incorporated hereinto by reference. A fluid flow sensor is described by the U.S. patent application, Ser. No. 124,419 filed Feb. 25, 1980 by Durham et al entitled "Method of Automated Fluid Flow Measurement with Silicon Sensor", now U.S. Pat. No. 4,319,483 issued Mar. 16, 1982 which is incorporated hereinto by reference.

It is clear that other devices and mechanisms are available which will measure selected conditions or states within the vessel itself and which need to be monitored for the proper operation of the vessel without losing the spirit or scope of the invention.

Another important aspect of the invention is its ability to monitor a digital radio teletype so as to receive weather information and other messages relating to the local or to the vessel itself. In this operation, the control means receives its data from an outside source via its radio telephone and utilizes this data to map a weather frontal zone or other weather condition on the electronic map being displayed to the operator. The operator need only look at the single combination display to be fully cognizant of many different and varied data, all of which correlate one to the other. In this example, the operator is appraised, at a single glance, of the position of the craft, its speed and course relative to the surrounding land masses, weather fronts, ships, and the like.

Each individual vessel has its own specific needs which are satisfiable by this invention. For example, where a super tanker is involved, there is a need to monitor the level of combustible gases within its hold, whereas this need may not be significant in a pleasure craft. All of these monitors may be included as part of the invention so as to provide an overall system which is specifically tailored to the craft. Alarms and other means for appraising the operator of the status of the craft are particularly susceptible to being incorporated into this system. As noted earlier the control means acts as a central clearing house for the data and its correlation to the other devices prior to its communication to the operator.

RADAR

The addition of a control means which is able to manipulate and correlate data is particularly important for the radar system of this invention. A radar receives more bits of information than it is capable of communicating via a typical nine inch screen. Typically, the extra bits are averaged out so that their informational content is blurred. The data from the radar is accepted by the control means which takes this data, magnifies it, and manipulates it in any way in which the operator requests. This manipulation or magnification is permissible since the information is stored in a digital form compatible with the control means.

One operation to which the digital radar data is capitalized upon by the control means, is the operation of artificially moving the center or datum of the radar. The datum may even lie off the vision of the screen. Since the area in front of the vessel is typically of more concern than the area to the rear of the vessel, the center of the screen, i.e. where the craft lies, may be moved to the lower portion of the display permitting the range of vision forward of the vessel to be improved and the resolution heightened.

To exemplify this advantage, assume a typical nine inch screen allows a vision of one mile by the radar unit. If the datum point be positioned at the physical center of the CRT, four inches (half of the CRT screen) maps into one mile (4 inches=1 mile); whereas, should the datum point be positioned at the bottom of the CRT screen, the entire screen may be utilized to represent the same one mile (8 inches=1 mile). This improves the resolution and also allows a greater vision than is normally possible.

Additionally, the digital data from the radar device is matched to operator input so as to allow the control means to keep track of a particular digit or point. For example, a particular blip or data digit which represents a sister ship may be labeled on the screen so that the operator, at a glance, is kept abreast of its relative change in position.

The center of the screen need not be centered laterally but is optionally right or left juxtaposed so that the position of a particular shore line may be effectively monitored. Hence, should the vessel be traveling with the shore line on its port bow, the center of the screen is right juxtaposed allowing the shore line on the left to be effectively heightened through resolution.

The center of the screen is movable completely off the screen itself allowing a particular zone of interest to be magnified to any extent which the operator desires. The operator need only indicate the area of interest and the magnification desired to have the associated resolution obtained for the area in question.

One such device which is disclosed appropriate in this context is U.S. Pat. No. 3,953,849 issued to Couvillon on Apr. 27, 1976, incorporated hereinto by reference.

ELECTRONIC CHART OPERATIONS

As discussed before, one aspect of the invention involves the use of an electronic chart to digitally represent the two characteristics of the face of the earth. In the marine environment, these characteristics would include the shore line defining the land to water relationship with shallow to deep water lines and navigational aids being identified.

The digital representation is stored in some memory means such as a ROM, bubble memory, or a magnetic tape device such as a cassette. A volatile display such as a CRT is utilized to display and hence communicate the contents of the digital representation to the operator. The volatile display is controlled by some means for displaying or other control means which effectively alters or changes the resolution or magnification of the map as per the instructions of the operator.

The memory means is preferably detachable from the control means. The detachable feature permits the vessel to carry numerous charts as stored in respective memories so that a library of electronic map-defining memories is available for future use. This feature also permits the addition of a map of a new area for the vessel.

Since the CRT is preferably small in size so as to accommodate the confines of the cockpit, an entire chart is not shown with a proper resolution which a typical chart is able to obtain. In operation, the control means accepts the digital data and manipulates it to obtain the proper magnification or resolution desired by the operator; the resultant electronic chart is displayed on the CRT. The common paper chart is utilized to define the basic size of the electronic chart since it correlates and matches the custom and usage of the marine environment.

To encode the analog paper chart into a digital chart of the preferred embodiment, the paper chart is divided into 1,536 lines and columns representative of the resolution of a cathode ray tube. Each column or alternatively each roll will act as a scan level which is subsequently encoded. The value 1,536 is the preferred number although in practice any number may be used.

The encoding of the scan level capitalizes on the dual characteristics as defined and encountered in the marine environment. That is, two characteristics are important to the electronic chart, the land to water or shore line. The encoding of the scan level involves establishing a first indicator signifying whether the origin of the scan level, preferably the left-justified position on the scan level on a row scan level, is either land or water. The next selected number of bits indicate the actual number of transitions or shore lines encountered in the scan level; for example, should the scan level cross land/water or water/land situations three times, the next bits stored indicate the number three. The distance between land/water boundaries is defined as a ray. The length of the ray is stored subsequent to the number of crossings indicated in the memory means. One important aspect to note is that the final ray need not be defined as to its length, since its length must be the complement of 1,536 (the number of columns) and the summation of the total rays to that point. This reduction helps to reduce the overall complexity and length within the memory means required to define a particular scan level.

Each scan level is consecutively encoded on the memory means so as to be retrievable by the control means. At the end of the last scan level, an end-of-tape or other appropriate means for marking is placed so as to indicate to the control means that the entire chart has been defined.

The control means utilizes the memory means data to define the electronic chart. The operator is able to define the resolution desired or to have a particular section of the chart displayed. By moving the cursor or other indicating means to a particular spot and indicating the magnification desired at that point, the surrounding locale at the desired magnification is displayed on the CRT.

So as to reduce the amount of working memory necessary within the control means, upon each selective magnification or movement of the cursor to a new locale within the overall chart, the entire memory means containing the digital map is re-read and re-computed to obtain the appropriate resolution and center. The center or datum together with the magnification absolutely defines the chart to be displayed. This re-reading and display is estimated to take approximately two to three minutes. This reduced speed though is not critical in the marine operation though since the analysis of a chart by the operator is typically done well in advance of its actual use. The user is capable of selecting a next chart in advance of its use so that upon demand it is quickly available.

The magnification of the electronic chart utilizes several methods for obtaining the desired reduction. The preferred method is an averaging of the surrounding points so as to obtain the best guess as to whether that particular point at that particular resolution is either water or land in its nature. An alternative method is to skip or to omit the appropriate particular rows or particular columns in defining the land/water relationship.

Although a marine environment is used to describe this particular situation, i.e. a land/water relationship, it will be apparent to those in the art that any suitable other two characteristics may be chosen and may be utilized in defining the electronic chart within the scope and spirit of the invention.

ELECTRONIC CHART EFFECTIVENESS

With the aid of the electronic chart in digital form, a microprocessor or other control means is capable of utilizing it to better improve the efficiency of the operator. The information provided by the chart is in proper form for combination with other digital data so as to create a highly informative resultant data combination.

The display of the electronic chart is heightened through the addition of a position determining means such as a Loran-C receiver or the like, coupled to the control means. The position of the craft is correlated to the electronic chart so that the position of the craft relative to the surrounding area is provided in the proper location on the chart. The operator is therefore able to ascertain the nearest land mass or other vessels in his path or the appropriate action to take to enter a harbor.

The position of the vessel relative to rivers, lakes, islands is instantaneously ascertainable. This alleviates the need for the operator to obtain the absolute position from the Loran-C receiver or other position determining means and to physically match it to a paper chart. The physical conditions surrounding the craft provide a dynamic aspect so as to create a display having a greatly enhanced ability as an aid to the operator.

AUTOMATIC DISTRESS CALL

The position determining means is additionally important when a distress call or "Mayday" is to be communicated from the vessel. Without the actual or absolute position of the craft being communicated, any rescuer is subjected to the time consuming task of trying to translate the distress call, if possible. Triangulation though, as a position determining procedure requires at least two receiving units and intrinsically has a high degree of error.

The control means is in communication with the position determining means so that the absolute position on the earth of the vessel is constantly known. Should an emergency situation exist, the control means obtains the absolute position of the vessel and uses this position to determine the nearest land based receiver which is capable of receiving a "Mayday" or distress call signal. This land base station has a predominate human language spoken there, which is defined for the control means. Through the use of the voice synthesis means as described earlier, the control means formulates a "Mayday" signal and message which incorporates important data relative to the emergency call, including but not limited to the position of the craft. The message may additionally include such information as the class identification, type of distress, crew members involved, and any other relative information which will help in a rescue attempt. The "Mayday" message from the voice synthesis means is communicated on the primay emergency channel as defined by the governmental entities such as the Federal Communications Commission (FCC).

The transmission of the distress call signal is typically provided via a single side band radio such as disclosed in U.S. Pat. No. 3,195,073 issued to Penn on July 13, 1965, incorporated hereinto by reference.

Although the frequency chosen by the FCC or other governmental entity is chracteristically kept clear, that is, devoid of nonemergency transmissions, sometimes a transmission is being carried over that frequency so as to interrupt a possible distress call signal. In this situation, the control means determines that a not-clear condition exists on the initially selected frequency and automatically changes to a second or possible a third chosen frequency for transmission, the key objective being to transmit the "Mayday" signal on a frequency having the highest probability of being monitored. Once the primary frequency becomes clear, the control means automatically changes back to that frequency for transmission of the distress signal.

So as not to dominate a particular radio channel, a controller terminates the transmission after some amount of time. This keeps a channel from becoming inoperative due to saturation.

Another aspect of the invention involves the transfer from one language to another language depending upon the probability of a particular language being intercepted as the "Mayday" signal by someone capable of understanding that language. Particular areas of the earth have a predominate language spoken therein. This predominate language depends upon the water travel and the location of land masses; for example, should the vessel be in distress off the coast of Brazil, the "Mayday" message would be transmitted primarily in Portuguese and possibly secondarily in Spanish. As many languages as are encountered are correlated to their probabilities of being heard and the "Mayday" message is transmitted in any or all the languages which are of interest.

This device then creates a "Mayday" signal which is highly accurate and capable of communication in the human language or alternatively, if desired in morse code. The message is communicatible to any number of people and not limited to a single language or form. Since the "Mayday" message is an auditory language signal, the operator of any receiver who understands the language being transmitted is able of understanding and ascertaining the necessary facts of the "Mayday" message. This facilitates the collection and determination of the facts concerning the nature of the distress encountered by the vessel so that potential rescuers are better able to make a proper rescue attempt.

One important advantage to the invention is that it is fearless and literally transmits until the vessel sinks or the invention is destroyed. A shut-off situation allows the operator to terminate transmitting should the distress situation cease.

DRAWINGS IN BRIEF

Figure 3A:
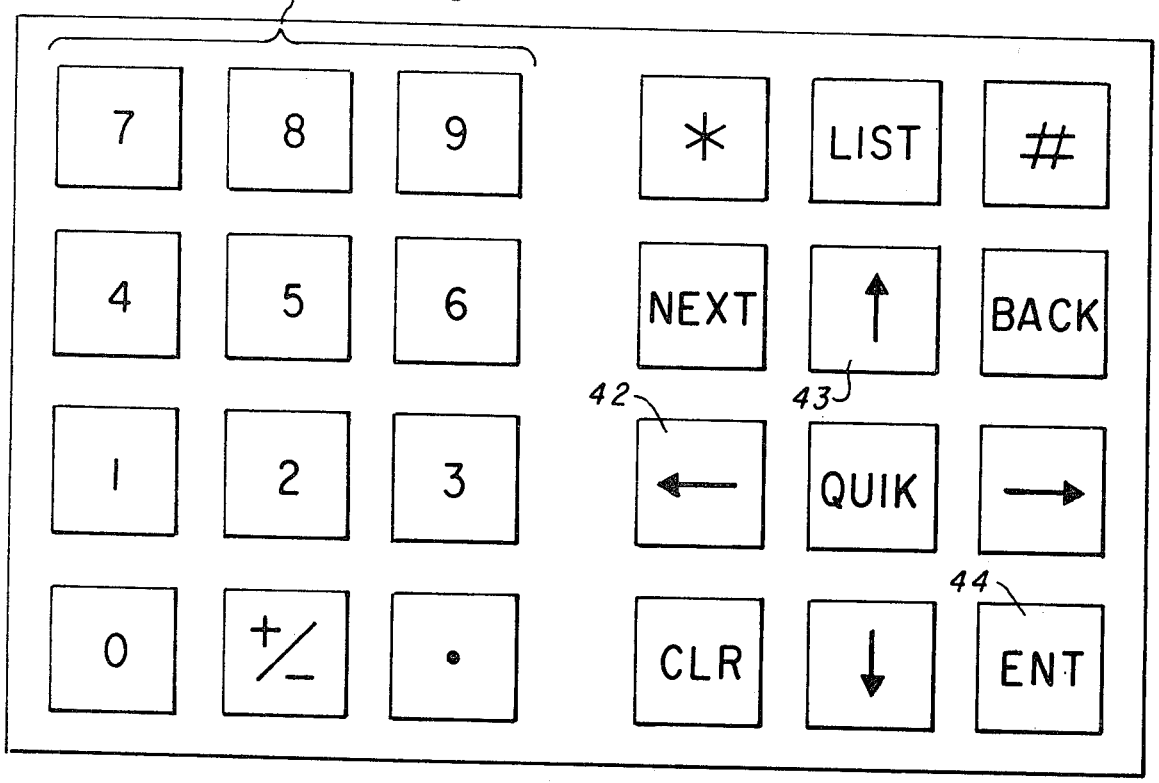

FIG. 3a i a diagram of an operator interface keyboard.

Figure 3B:
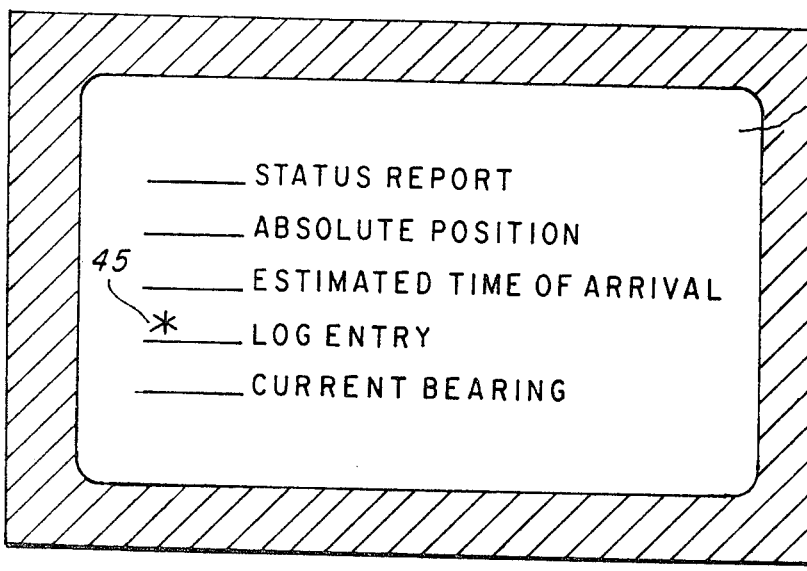

FIG. 3b is an illustration of a menu available for the operator selection.

FIG. 4 is a flow chart of the automatic logging apsect of the invention.

Figure 5:
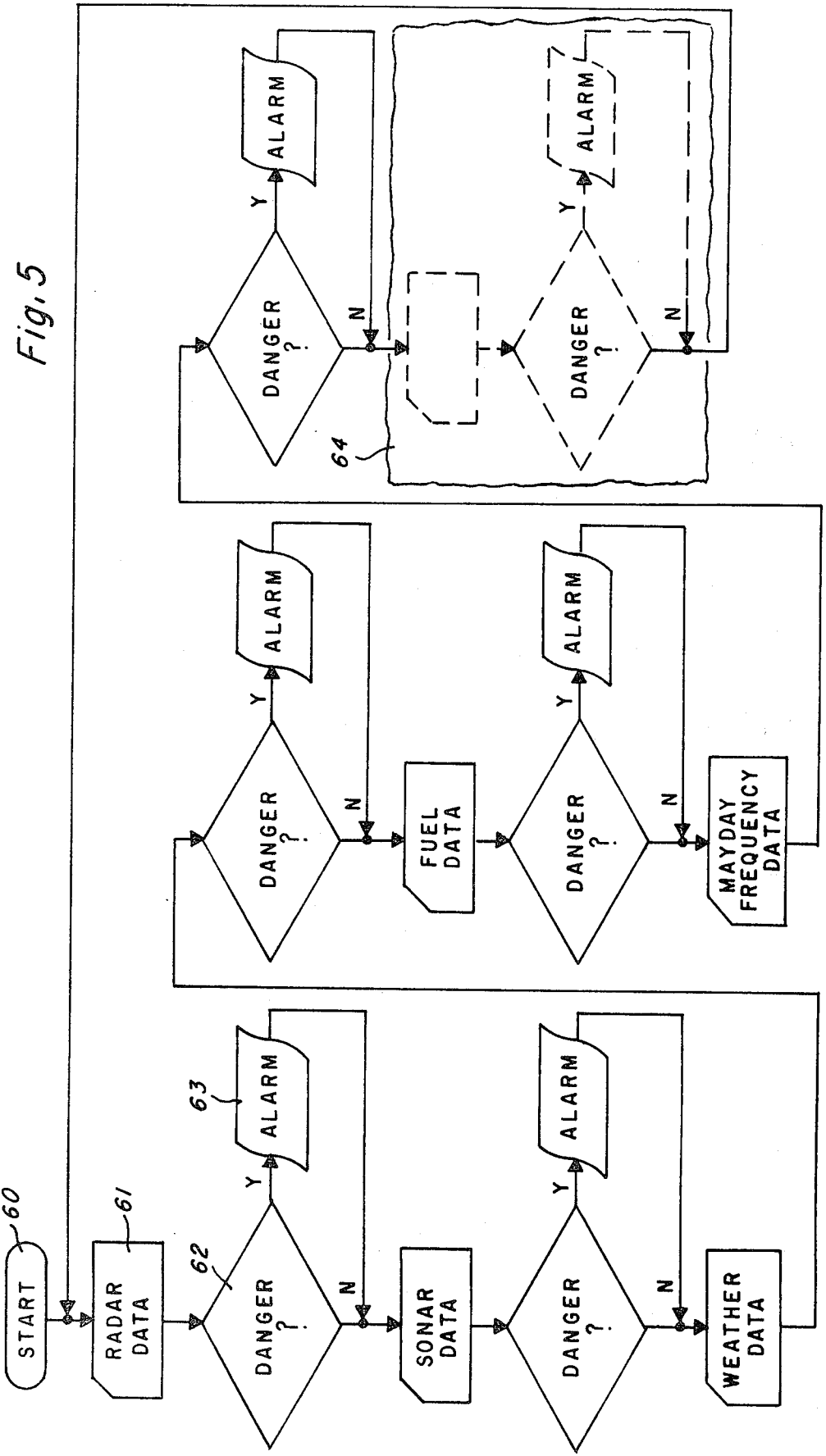

FIG. 5 is a flow chart of the dangerous condition monitoring aspect of the invention.

FIG. 6 is a pictorial view of the invention in a marine environment.

Figure 7A:
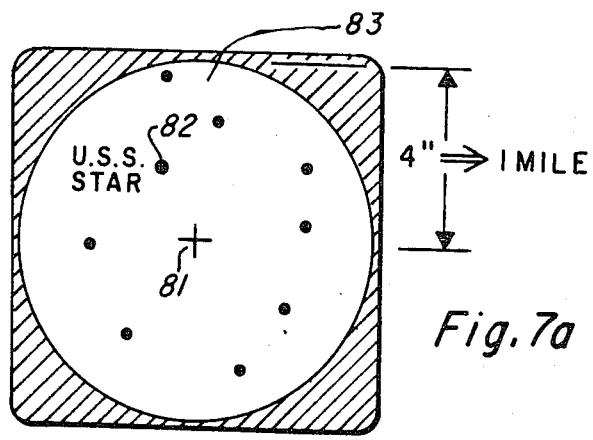
Figure 7B:
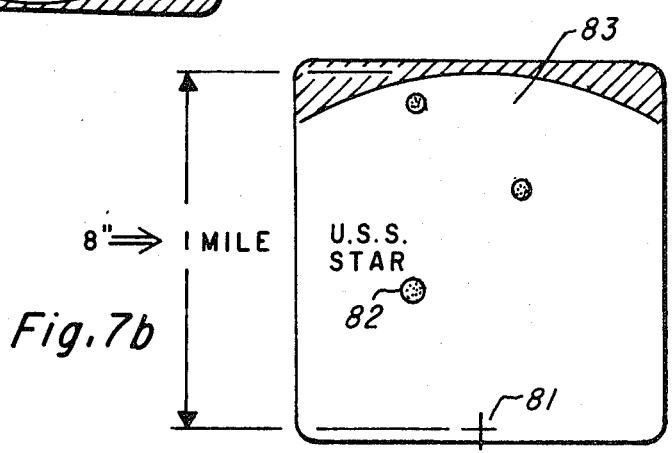
Figure 7C:
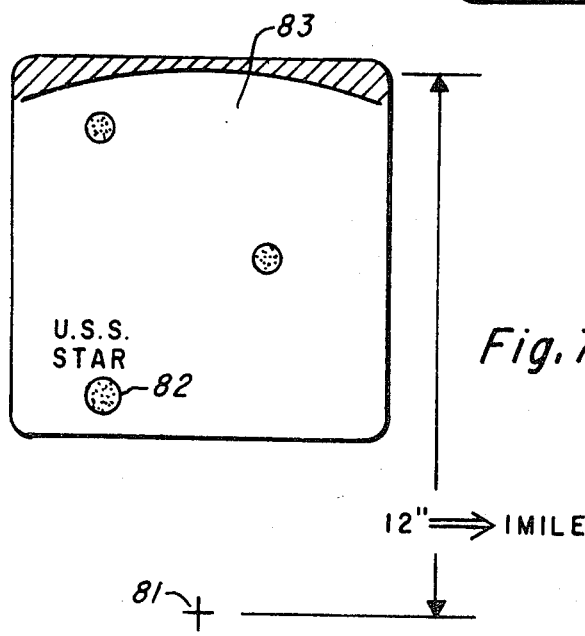

FIGS. 7a, 7b, and 7c are illustrations of the radar screen enlargement and datum point movement.

Figure 8:
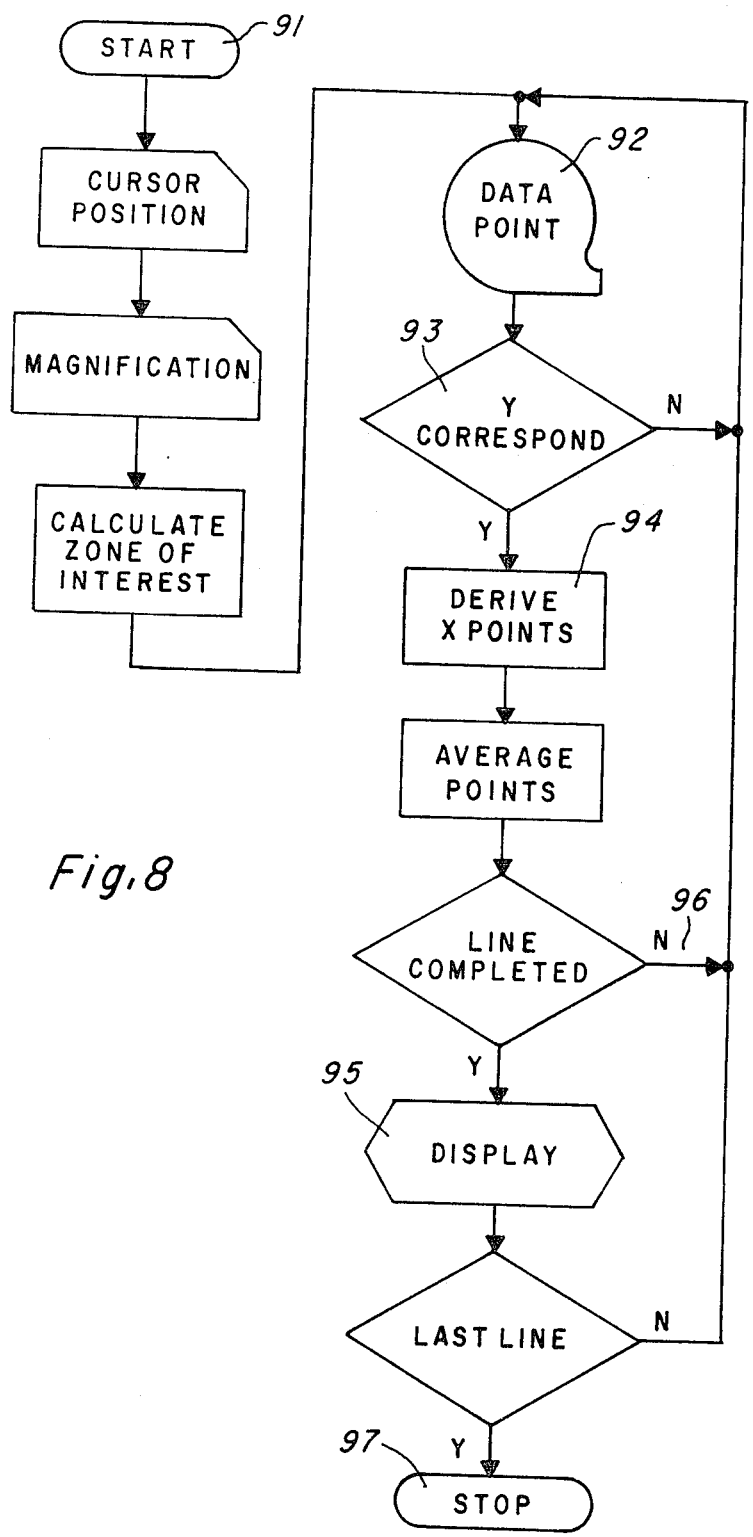

FIG. 8 is a flow chart of the preferred magnification process used in the electronic chart.

Figure 9:
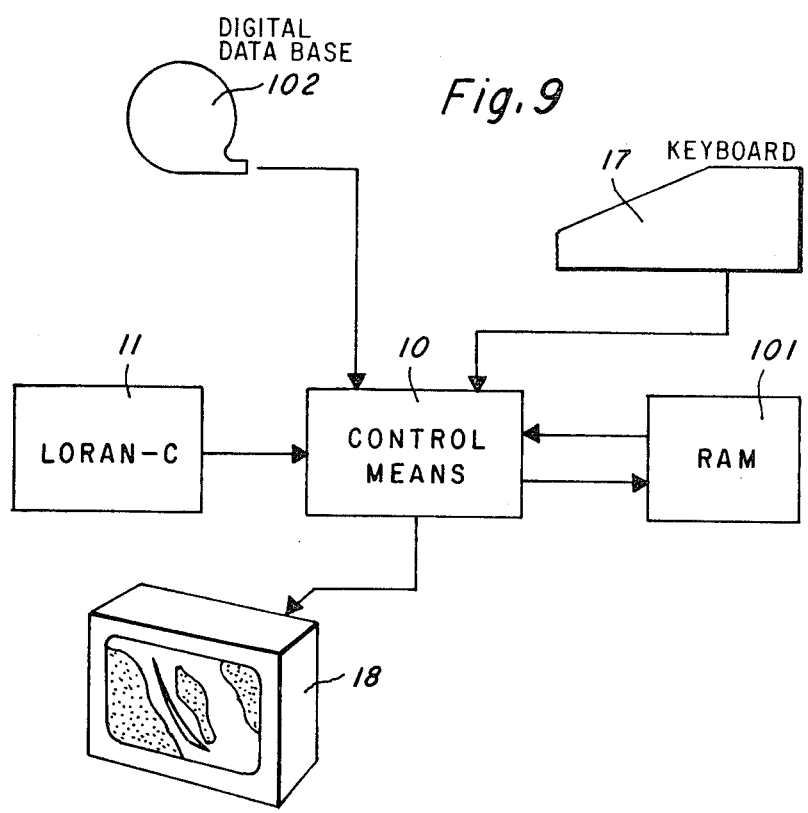

FIG. 9 is a functional block diagram illustrating the interplay for the electronic chart with position determining means.

Figure 10A:
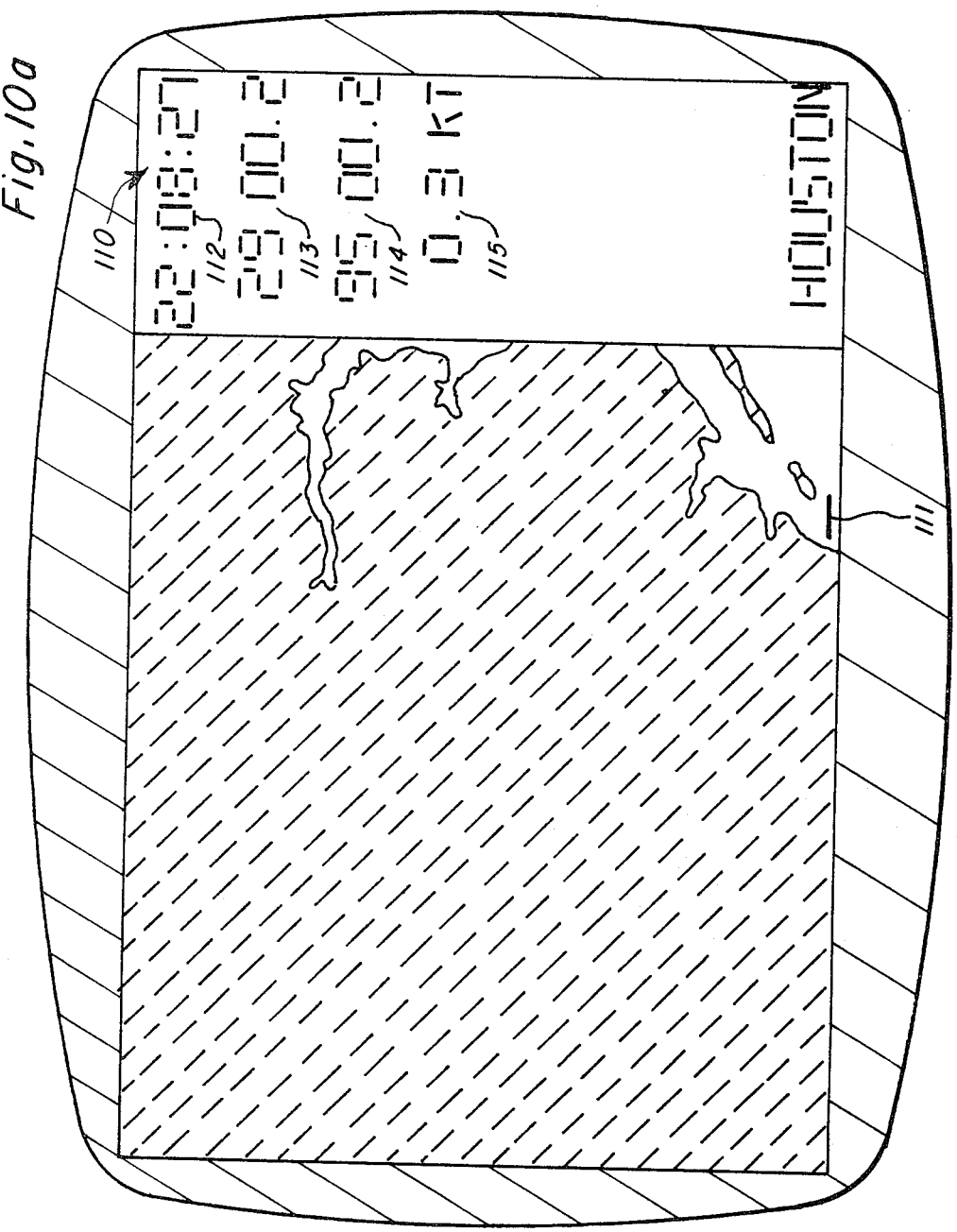

FIGS. 10a and 10b illustrate the electronic chart with its enlargement capabilities.

Figure 11:
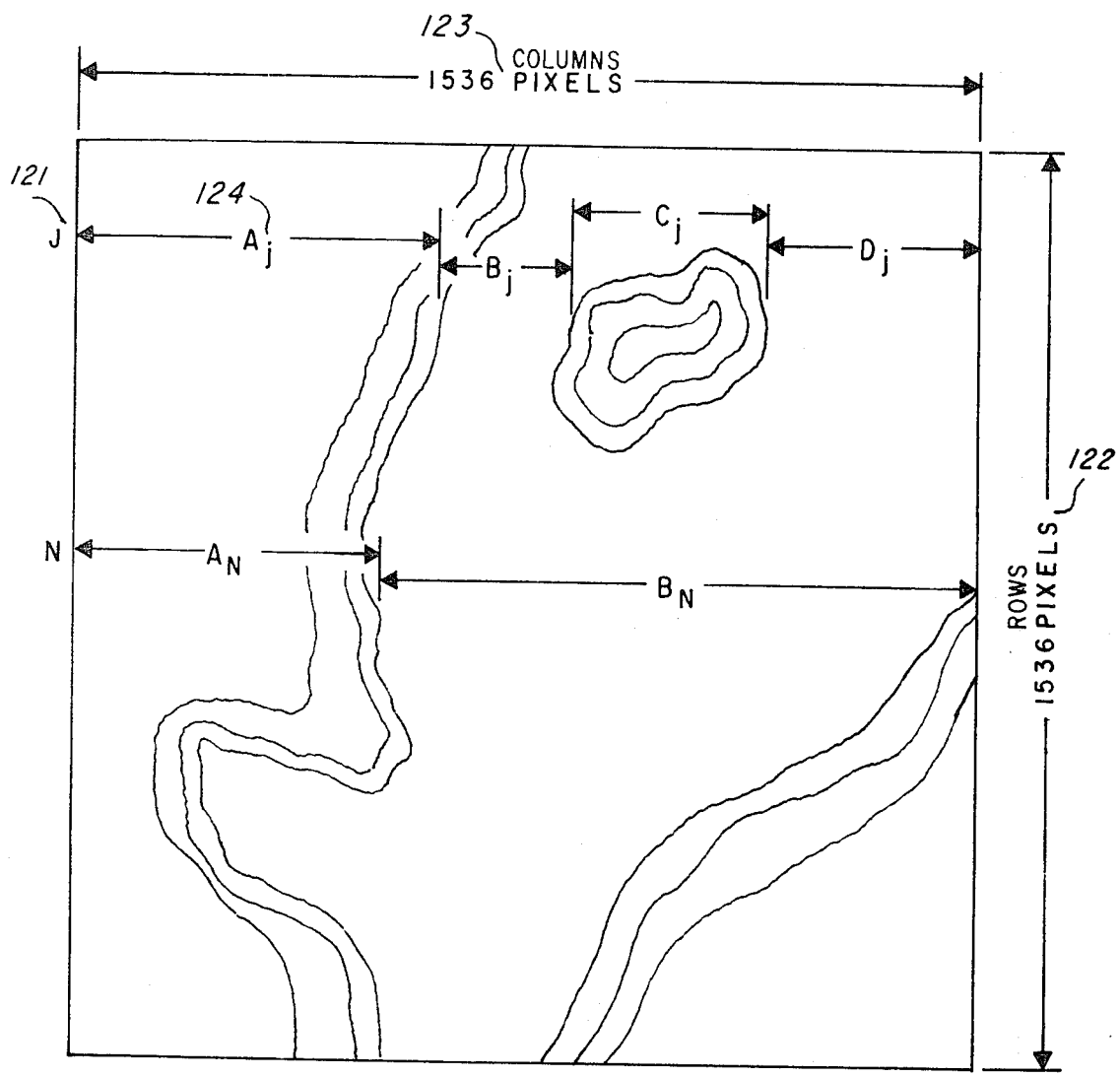

FIG. 11 illustrates the scan level method of encoding a digital map.

Figure 12A:
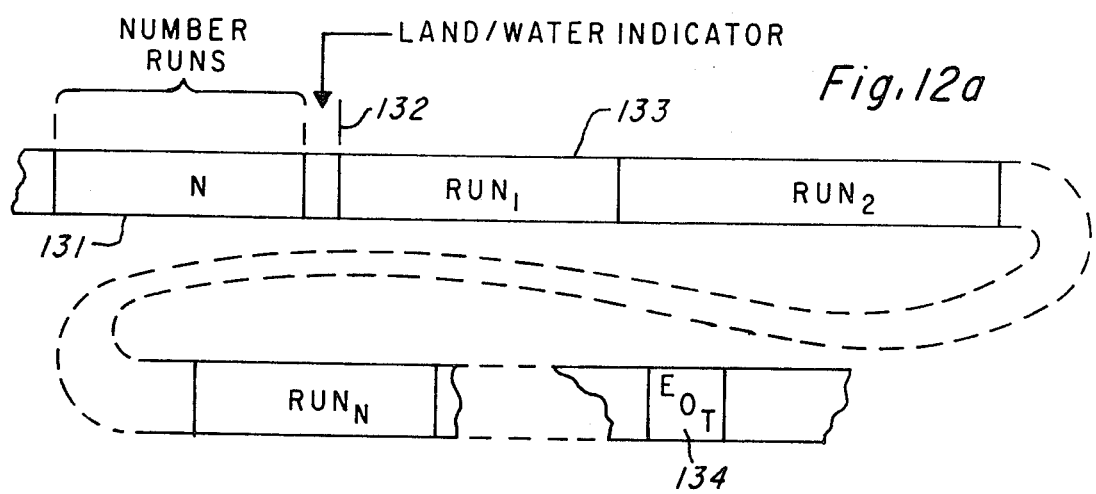
Figure 12B:
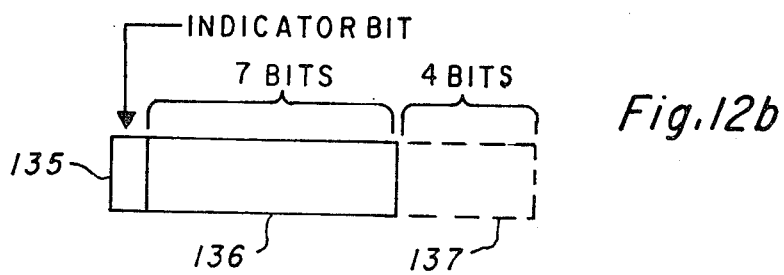

FIGS. 12a and 12b illustrate the encoding organization on a memory means.

Figure 13:
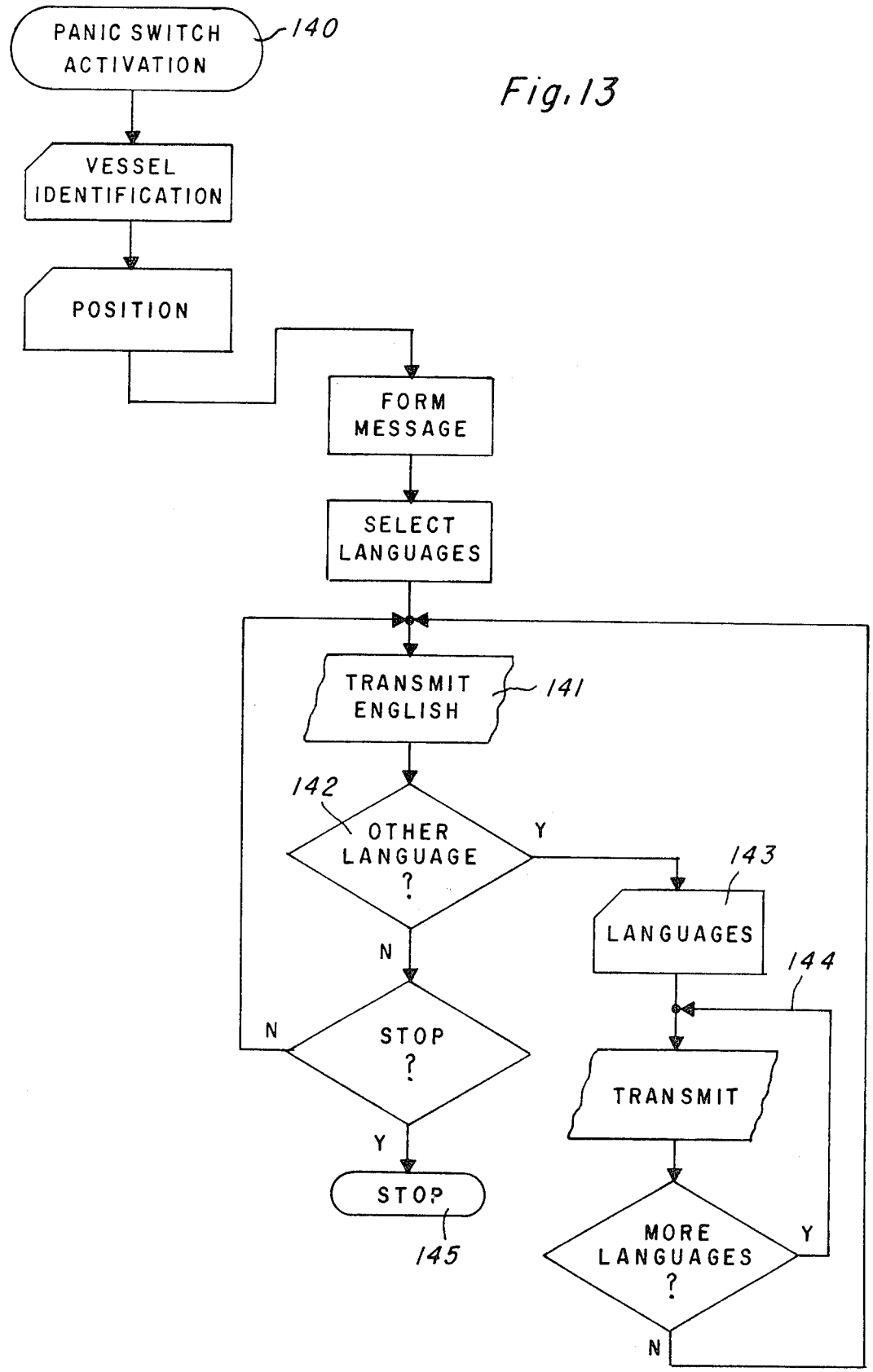

FIG. 13 is a flow chart of the automatic distress signal generator.

DRAWINGS IN DETAIL

Figure 1:
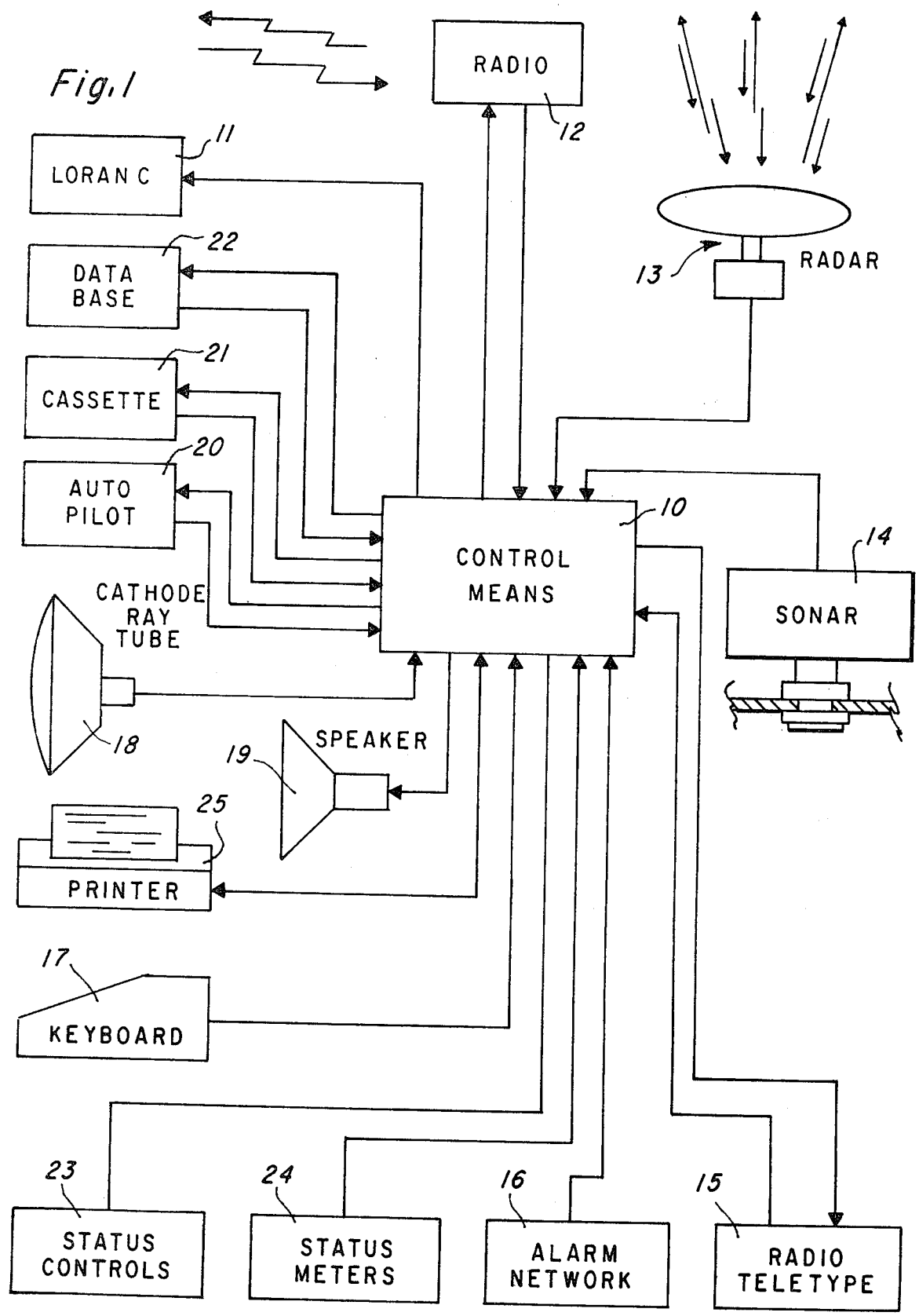
FIG. 1 is a functional block diagram of an embodiment of the overall invention.

FIG. 1 is a functional block diagram of an embodiment of the invention illustrating the integration into a system. The data from the various peripheral devices is screened and manipulated by the control means prior to its display or utilization.

The control means 10 may be such apparatus as the TMS 9900 microprocessor integrated circuit chip available from Texas Instruments Incorporated of Dallas, Tex. Data from peripheral units is communicated to the control means 10 which sifts this data and correlates it so that it may be combined into a single intelligible form for communication to the operator via the CRT 18, printer 25 or the speaker 19. The dual channels of visual and auditory communication to the operator permit the operator to either visually comprehend the data via the CRT 18 or printer 25, or to audibly monitor the incoming data via the speaker 19. Certain types of data are more susceptible to a visual display than an audible communication and vice--versa. This combination of voice synthesis together with a visual display provides the invention with a range of operation to fully capitalize on the ability of the operator.

The control means 10 accepts data from such devices as the Loran-C receiver 11, the radio 12, the radar device 13, sonar device 14, a radio teletype 15, alarm network 16, the autopilot 20, a magnetic tape cassette 21, or a data base 22. Additionally, status meters 24 and their status controllers 23 may be added to the system to further tailor the invention to the particular needs of the vessel.

As an example of this interplay of data, the data from the Loran-C receiver 11 absolutely establishes the position of the vessel on the surface. This information is combined with the electronic chart which is stored in the cassette 21. The combination of these two data sources provides a visual representation on the CRT 18 of the absolute position of the vessel being dynamic in time. The display on the CRT 18 is further enhanced by the data received from the radar device 13 which indicates other dynamic data such as the relative positions of other craft. To further add to the amount of data communicated to the operator the radio 12 receives digital information as to weather conditions so as to place them in their relative position on the electronic map also being displayed to the operator.

The control means additionally monitors certain conditions on and off the vessel so as to make sure that a dangerous situation does not develop. These devices which the control means 10 monitors include the sonar 14, and an alarm network 16 which will indicate a dangerous condition. As an example, the alarm network 16 may be check for the presence for of combustible gases within the hold of the vessel. The control means additionally monitors the radio teletype 15 for any transmission occurring thereon either on the emergency channel or for receipt of incoming messages.

As noted by the status meters 24 and the status controllers 23, the system is expandable to meet the particular needs of the vessel in question. Other instruments are combinable to the control means so as to enlarge the particular attributes of the invention.

A keyboard 17 permits the operator to input data to the control means 10 should one of the devices be inoperative or to supply information such as the identification of a particular radar blip as being a sister ship. The control means 10 utilizes this information to keep track of the sister ship.

In this context, the keyboard 17 may be used by the operator to input data to the control means 10 should an apparatus such as the Loran-C receiver become inoperable; the operator takes a visual sighting and inputs this data so that the control means 10 has sufficient data for its operation.

Keyboard 17 also allows the operator to enter commands or operation selection into the control means 10. This permits the functionality of the invention to be selectively altered.

The control means 10 furthermore senses if a power-down situation or emergency situation is occurring and actuates the printer 25 to print any necessary information for future reference. This feature provides a fail safe situation so that the operator is not left without any reference material should the system fail.

Periodic reports are also made by the control means 10 via the printer 25 for operator use so as to allow a paper copy update of the process. The cassette 21 also receives the data as to the automatic operations log which contains such information as the absolute position of the vessel (as reported by the Loran-C receiver 11) any messages received by the radio 12, along with the comments of the operator as communicated via the keyboard 17.

In this fashion, an integrated system is created so that the elements thereof interplay one with the other in their production of combined informational data to the operator so as to heighten the operator's efficiency and overall performance. The system is additionally tailorable to the specific needs of the vessel and its operation is alterable via a program or the like which is inputted to the control means 10.

Figure 2:
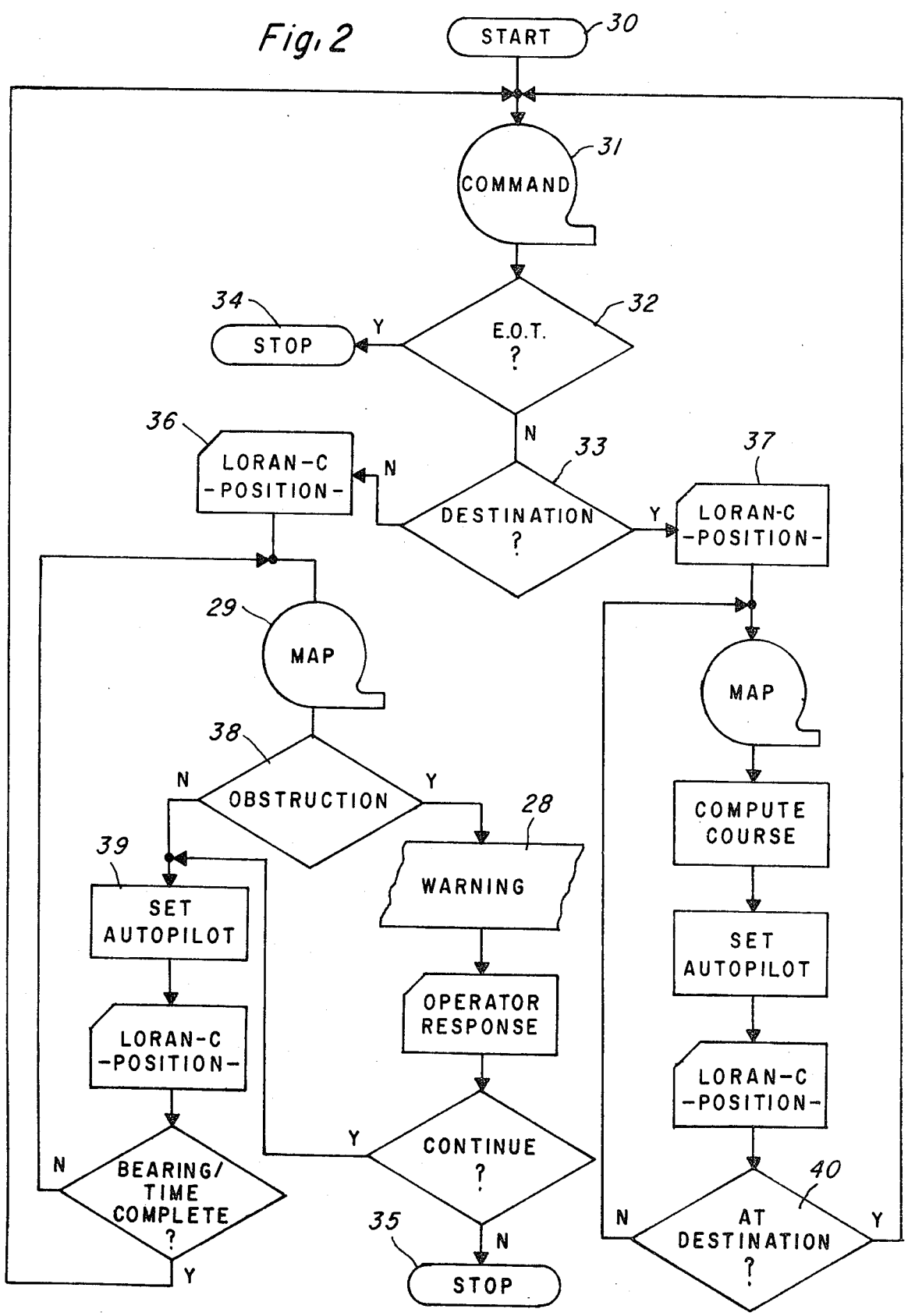
FIG. 2 is a flow chart of the autopilot operation.

FIG. 2 is a flow chart of the autopilot operation of the invention.

The program is started at 30 where it receives the initial command 31. The command 31 is checked to see if it is an end-of-tape (EOT) 32; in which case the program stops 34.

As noted earlier, the data from the command 31 may have two forms (1) an absolute destination or (2) a bearing, speed and time data. The data is checked for a destination 33. If it is a destination, the Loran-C position 36 of the vessel is computed; the position relative to the map is analyzed; the proper computation for the course is made; the autopilot is appropriately set; and the Loran-C position is again monitored; and the position is checked to the destination to see if the vessel has reached its destination 40. This loop is repeated until the vessel reaches its destination at which time the next command is obtained 31.

Should the information not be the destination information 33; but, instead contain the bearing, speed, and time lapse, the absolute position of the vessel 36 is determined by the Loran-C receiver in which it is checked as to the map stored in the cassette 29. The two combinations of data (the position compared to the bearing, speed and time lapse) together with the electronic chart, determine if an obstruction lies in the course 38 of the vessel. Should an obstruction exist in the path 38, of the vessel a warning 28 is issued to the operator at which time the operator has the option to override the cassette bearing and stop the autopilot 35 or alter it as to his command. Should the operator decide to continue on the designated bearing the control means 10 will ignore the obstruction situation and set the autopilot 39. The Loran-C provides data as to the absolute position of the craft and the control means continues in that bearing until the bearing and time has elapsed so as to complete the command. Once complete the control means returns to retrieve another command 31.

In this fashion, either a single or a sequence of instructions as to bearing, time, and course or absolute destinations is delivered to the control means which utilizes them in the operation of the craft. This alleviates the need for a navigator, the tedious task of plotting the course, and the necessity of constantly monitoring the progress of the craft along the course. Additionally, a particularly fruitful course, such as one which produces a large load of fish, is repeatable ad infinitum, through the use of the cassette to indicate the points of destination or bearing and time which are desired by the operator.

FIGS. 3a and 3b illustrate the preferred embodiment of the operator interface and CRT illustrations.

The keyboard 41 contains the numeric keys necessary for entry of particular data for the operation. Additional keys such as 42, 43 and 44 allow the operator to move through the menu of commands and appropriately choose his command from a menu 46. As an example, a cursor 45 may be moved either upward, arrow 43, or to the side, arrow 42. ONce the cursor is in proper location matching the label desired, the operator presses the entry button 44, at which time the control means, not shown here, performs the function indicated.

The use of the menu 46 is particularly important since it enables an operator with little or no computer expertise to use the navigational aid effectively. The menu 46 contains such information as a request for a status report, the absolute position of the vessel, the estimated time of arrival of the vessel, a request to allow a log entry, or the current bearing. There exist different menus so as to provide the operator with a full range of opportunity and alternatives.

Through the use of the numerals 41, the operator enters data either in the accounting form or, should one of the instruments or devices connected to the control means become inoperative, data relative to the operation of the defective instrument.

The entry of manually obtained data in lieu of instrument obtained data into the control means permits the system to continue operating even though one of its instruments is malfunctioning. This also acts as a safety feature.

FIG. 4 is a flow chart of the automatic operation log entry characteristic of the invention.

In one embodiment of the invention, the automatic log is triggered at periodic times so as to make a nonvolatile record as to the position and status of the vessel. Once started 51, the automatic log characteristic of the control means determines the time the log is being entered, the absolute position of the craft as determind by the Loran-C receiver or other means, speed, and course, and stores this data on the nonvolatile memory such as the magnetic tape cassette discussed earlier. The operator may enter selected data as to specific events by use of an interrupt which allows him to enter log data 52.

Once the log data 52 is appropriately entered, the device cycles back to maintain and re-enter the data.

The log operation is triggered at preset time intervals, such as after each watch or once a day.

In this fashion, an automatic log which is far more accurate than the human entry, is preserved for subsequent analysis or records. Although the log is made automatically, the operator is capable of entering data as well. Since the log is digital in nature, it is more readily available to analysis and transcribing once the vessel returns to home port.

FIG. 5 is a flow chart of the method of determining a dangerous condition within the vessel.

The monitoring of a dangerous condition within the vessel is particularly important so as to preserve the safety of the vessel and the passengers on board. Numerous conditions may exist which will endanger the vessel or its occupants and these conditions are individually or combinationally monitored.

Once started 60, the initial condition checked is the surrounding area via the radar, so as to determine if a collision with another vessel is imminent. The radar data 61 is received and a determination as to a dangerous condition is made 62; if a dangerous condition does exist, an alarm 63 is sounded via the voice synthesizer or other bells or auditory means so as to alert the operator as to this condition and a log entry is generated. A similar process of sampling the data from a sensor or device, determining if a danger exists, and sounding an appropriate alarm is repeated using the sonar device. This process is repeated for all of the sensors such as weather data, fuel condition, "Mayday" frequency monitor, or as tailored to the particular vessel 64.

This program allows the critical, yet mundane, tasks of monitoring the fuel and radar to be essentially accomplished by the system in accordance with the invention, such that the time of the operator allotted to the performance of these tasks can be reduced to a minimum. This increases the efficiency of the operator by relieving him of boring and time consuming tasks.

FIG. 6 pictorially illustrates the overall system integrated into a vessel as a single unitary system.

The center of the system 71 lies in the cockpit area of the vessel. The center 71 is comprised of the control means and operator interface. As noted earlier, the operator interface has both visual and auditory communication ability together with a keyboard so as to allow operator input.

The center 71 communicates with the remote devices and apparatuses lying at various locations throughout the vessel. These remote devices and apparatuses monitor conditions necessary for the efficient operation of the vessel. For example, these apparatuses include radio transmission via antenna 73, the radar device 72, the sonar device 76, the autopilot 75 and the fuel level 74.

The entire vessel is therefore linked together in a single unitary integrated system which utilizes the data from all points within the vessel of concern to create a single informative communication to the operator and to monitor varying conditions throughout and without the vessel.

FIGS. 7a, 7b, and 7c, illustrate the advantage gained through manipulation of the center and magnification of the radar display.

In FIG. 7a the typical radar display 83 is illustrated showing a center 81 located at the geometric center of the display. In this example, the radar apparatus has a range of one mile with a display screen of four inches. This results in a four inch radii mapping as one mile. A particular blip 82 within the screen 83 has been identified by the operator as a sister ship, the U.S.S. Star. By labeling a particular blip, the control means is able to monitor its movement and to keep track of its operation as well as the vessel on which the system is installed. The tracking of other identifiable ships is of particular importance when the vessels are traveling in convoy fashion.

FIG. 7b illustrates the situation where the datum or center 81 has been moved to the bottom of the screen; thereby permitting the entire screen to represent the forward section or forward looking part of the radar device. Hence, eight inches (the entire screen) is now equivalent to one mile. The display of FIG. 7b has twice the resolution as FIG. 7a since the screen has been effectively doubled in size.

The movement of the window or view of the radar display allows the operator to, at will, improve the resolution of a particular area of concern. The manipulation of the digital radar data is accomplished via the control means.

In FIG. 7c the datum or center 81 has been moved completely off the effectively sighted area so as to improve the resolution even more; hence, 12 inches is equivalent to one mile so as to have three times the resolution of the window as shown in FIG. 7a.

By moving the datum 81 to any particular point, on or off the screen, the operator is able to, at his will to selectively heighten or improve the resolution of a zone of interest. This zone of interest may be either forward looking, backward looking, any side, or any angle. In the case shown, the absolute position of the U.S.S. Star 82 is heightened in FIGS. 7b and 7c to allow the operator to know and gather more information as to its status relative to other blips appearing on the radar. The amount of information which is communicated by the radar to the operator is thereby enhanced significantly.

It should be noted that even though the window has been moved to a N.W. location, the control means still receives data from the the radar soundings not within the window. This permits the control means to monitor for incoming bogies or other dangerous conditions which would not appear on the operator's window. This permits the operator to view a particular area without becoming totally blind as to other areas.

FIG. 8 is a flow chart of the preferred embodiment which magnifies the electronic chart so as to heighten the resolution thereof.

Once the program is started 91, the position of the cursor within the screen indicating the left most corner of the display map is determined and the selected magnification is determined. The selected magnification is entered via the keyboard or in a default situation, a preselected value is used.

Using the cursor position, the selected magnification, and the area of the display, the zone of interest is determined and the appropriate data points are utilized from the magnetic tape 92. Each data point is determined if one of its coefficients relates to the area or zone of interest 93. If the appropriate index is found, the secondary indexes are derived therefrom 94; otherwise a new data point is analyzed. In this embodiment the points are averaged to produce the appropriate resolution. In another embodiment, not shown, the line may be skipped so as to obtain the appropriate resolution.

Once the line is completed, the chart line is displayed as to the operator and the operation flips back to obtain the next line. Similarly, if the line is not complete 96, a new data point is determined. Once the last line is obtained the operation stops 97.

In this fashion, the operator enters the selected magnification as an absolute number via the keyboard and moves the cursor to the location of the chart in which he has an interest. This entered data is combined with the data in the storage means, preferably a magnetic tape cassette; the control means uses the combination in its magnification and subsequent display of the electronic chart.

FIG. 9 illustrates the interplay between the various components of the invention in the execution and delivery of the electronic chart.

The control means 10 accepts the operator input via the keyboard 17 as to the magnification and also data relative to the position of the cursor which is loop communicated back to the operator via the CRT 18. The control means utilizes a RAM or other working memory 101 in its manipulation of this data to obtain the area of interest within the electronic chart.

The digital data base 102, which may be a magnetic tape cassette, supplies the map data to the control means. The chart data is manipulated as to the magnification and the cursor position so that the desired chart is communicated back to the operator via the CRT 18. Through the use of a Loran-C receiver 11 or other position determining means, the control means additionally plots the absolute position of the vessel on the electronic chart which is displayed on the CRT 18.

This illustrates the cross matching between a dynamic condition, the Loran-C receiver data, and the static condition, an electronic chart. This cross matching communicates, to the operator, in a single glance what normally takes mental correlation and manipulation on a paper chart by the operator; this significantly reduces the operator effort, so as to relieve him to perform tasks more suited to human evaluation and judgement.

FIGS. 10a and 10b illustrate an electronic map and its magnification enhancement.

In FIG. 10a, the electronic map of a land mass and shore line is illustrated of the Houston area. The additional information 110 shown as a display adjacent to the electronic map relates to the time 112, the longitude 113, the latitude 114, and the speed 115 of the vessel.

Numerous charts may be stored on a single cassette so as to define the entire trip of course of the vessel from start to finish. The physical storage requirements of a magnetic tape cassette are minimal so as to allow a library of charts to be carried easily on the vessel. By inserting a new cassette, the operator has a fresh choice of maps to view.

As the operator nears the harbor of Galveston, he moves the cursor into the area as indicated by the cursor 111 and magnifies the original chart to highlight that particular area. This is illustrated in FIG. 10b. The cursor 111 is in the left most position, which, together with the selected magnification illustrates the Galveston harbor. Again, additional information 110 is communicated to the operator on the side of the screen. The resolution of FIG. 10b is much greater than the resolution of FIG. 10a so as to permit the operator to determine more accurately the necessary course and conduct.

The magnification of a particular area on the electronic chart is not dependent on the absolute position of the vessel but may be any area within the electronic chart.

FIG. 11 illustrates the preferred encoding scheme for the electronic chart so as to reduce the actual number of bits necessary for storage and thereby allow the efficient storage of data.

The map of FIG. 11 is divided into 1,536 columns 123 and 1,536 rows 122. Either the columns or the rows or a diagonal thereof may be taken to form parallel scan lines 121 which are encoded to define the electronic chart. Each scan line consists of variable rays, such as $A_j$ 124. As an example, scan line J 121, consists of four rays. Each ray is of a finite length; the sum of the rays within a scan line must equal 1,536, the length of the scan line. In the encoding scheme a particular scan line having K number of rays will need only K-1 numbers to totally define the length of all the rays. The end ray must have a length which is the complement of the summation of the other rays from 1,536.

FIGS. 12a and 12b illustrate the preferred encoding of the electronic chart of FIG. 11 which is put on the magnetic tape.

As noted before, each scan line consists of a particular number of rays defined by N 131. The first ray of the scan line is land or water and is indicated so by the land/water indicator 132, a single bit. As an example, a "0" indicates water while a "1" indicates land. Thereafter, a number 131 defines the length of the first ray. The length of the next N-1 rays is stored on the magnetic tape in this fashion.

This sequence of scan line determination of the ray numbers, land/water indicator and runs is continued for the entire chart. An end-of-tape 134 is added to the magnetic tape to indicate that the entire digital chart has been defined.

The length of a ray such as encoded at 133, is variable so as to permit extension of the field to encompass the worse case situation. This variable length is illustrated in FIG. 12b. In this embodiment, the run bit length consists of a first indicator bit 135 which determines the length of the following field. As an example, assume that the indicator bit 135 is set to "1", thereafter, the next 11 bits, 136 and 137 will be used to define the length of the ray. Should though, the indicator bit 135 be not set, that is "0", then only the next seven bits 136 are used to actually determine the length of the ray.

In this fashion, the digital chart is encoded so as to require a minimum space. This takes maximum advantage of the magnetic tape.

FIG. 13 is a flow chart of the automatic distress call characteristic of the invention.

Once the panic switch is activated 140, either by human entry or by a sensor activation, the vessel I.D. is obtained from a data bank, the position is determined by the Loran-C receiver or other position determining means, and a message is formed incorporating these two sets of data.

The message or "Mayday" message words or phrases is formed from digital speech data located at particular addresses in the memory at the voice synthesizer. The words or phrases as represented by the digital speech data are then sequentially placed in storage and utilized as the "Mayday" message which is originally transmitted in English 141 or another chosen language. In this illustration, the original transmission is in English. A determination 142 is made if other languages should be used and if so these languages are obtained and transmitted 143. Multiple languages may be used and transmitted through a loop back relationship 144. The process continues transmitting the "Mayday" message until the operation is either stopped manually 145 or the device fails.

As is clear from the foregoing, in this invention, an integrated system providing a navigational aid in which the data is combined into a single communicative message to the operator is created permitting the previously independent systems to be correlated automatically without human intervention and thus relieving the operator of the time consuming operation of monitoring independent dials, switches, and other displays together with the need to correlate and match these independent data sets one to another. The system creates a much more efficient operator since boredom is reduced to a minimum because of a reduction in the operator effort required to perform the tedious and monotonous tasks associated with the overall operation of a vessel. Since the operator is freer to perform the human operations, a minimum of staff is necessary for the operation of the vessel.

What is claimed is:

1. A navigational aid system for providing correlated informational data in a form facilitating the operation of a craft, said navigational aid system comprising:

means for determining the status of at least one external physical condition independent of the operation of the craft but having significance with respect to the operation of the craft and producing first output data indicative thereof;

means for determining the status of at least one internal physical state of the craft independently of said external physical condition status-determining means and producing second output data indicative thereof;

means providing a surface characteristics representation of a selected portion encompassing an area of the surface of the earth related to the position in which the craft is disposed;

data processing means operably coupled to said external physical condition status-determining means, said internal physical state status-determining means, and said surface characteristics representation means for automatically correlating said first and second output data with said surface characteristics representation to produce combined correlated output data significant to the continued operation of the craft; and data presentation means coupled to said data processing means and responsive to said combined correlated output data produced therefrom to provide a presentation of said combined correlated output data in a unitary format readily comprehendible by an operator.

2. A navigational aid system as set forth in claim 1, wherein plural means independent of each other are provided for determining the status of respectively different external physical conditions independent of the operation of the craft but having significance with respect to the operation of the craft and producing plural first output data respectively indicative thereof;

plural means independent of each other are provided for determining the status of respectively different internal physical states of the craft independently of said plural external physical condition status-determining means and producing plural second output data respectively indicative thereof; and said data processing means being operably coupled to each of said plural external physical condition status-determining means and said plural internal physical state status-determining means in producing said combined correlated output data from said plural first output data, said plural second output data and said surface characteristics representation.

3. A navigational aid system as set forth in claim 2, wherein plural means providing a surface characteristics representation of respectively different selected portions encompassing different areas of the surface of the earth are provided, and one of said plural means providing a surface characteristics representation of a particular selected portion encompassing a specific area of the surface of the earth being selected for operable coupling to said data processing means in the production of said combined correlated output data.

4. A navigational aid system as set forth in claim 2, wherein said means providing a surface characteristics representation of a selected portion encompassing an area of the surface of the earth comprises non-volatile memory means storing digital data indicative of geographical features as located within the area of the surface of the earth represented thereby.

5. A navigational aid system as set forth in claim 4, wherein said memory means storing digital data representative of a selected portion encompassing an area of the surface of the earth comprises a magnetic tape cassette.

6. A navigational aid system as set forth in claim 2, wherein said data presentation means comprises a visual display on which an area of the surface of the earth as provided by said surface characteristics representation means appears as an electronic map together with graphical information corresponding to said plural first output data and said plural second output data appropriately located thereon.

7. A navigational aid system as set forth in claim 6, wherein said data presentation means further includes speech synthesizer means operably coupled to said data processing means;

speech memory means associated with said speech synthesizer means and having speech data stored therein from which words in at least one human language may be derived in the formation of messages relating to the operation of the craft;

said speech synthesizer means accessing selected speech data from said speech memory means in response to said combined correlated output data produced by said data processing means and providing audible synthesized speech stating a message relating to the operation of the craft.

8. A navigational aid system as set forth in claim 2, wherein said plural means for determining the status of respectively different external physical conditions includes position determining means for establishing the current location of the craft within an area of the surface of the earth;

memory means operably associated with said position determining means; and said data processing means including control means operably coupled to said position determining means and said memory means associated therewith for actuating said memory means to store first output data from said position determining means as digital data representative of the position of the craft at predetermined time intervals.

9. A navigational aid system as set forth in claim 8, wherein said control means of said data processing means is operable to actuate said memory means associated with said position determining means to store digital data representative of said plural second output data from said plural means determining the status of respectively different internal physical states of the craft relating to selected operating conditions of the craft at said predetermined time intervals.

10. A navigational aid system as set forth in claim 2, wherein said plural means for determining the status of respectively different external physical conditions includes position determining means for establishing the current location of the craft within an area of the surface of the earth as first output data;
  data storage means containing digital data representative of a chosen destination for the craft on the surface of the earth different from the current location of the craft;
  said data processing means being also operably coupled to said data storage means and being responsive to said first output data indicative of the current location of the craft and to said digital data representative of said chosen destination for the craft from said data storage means for providing as part of said combined correlated output data, output data representative of a bearing for the craft to travel for reaching said chosen destination; and
  autopilot control means operably connected to said data processing means and adapted to be connected to the steering mechanism of the craft, said autopilot control means being responsive to said output data representative of said bearing from said data processing means for regulating the steering mechanism of the craft to direct the craft to travel along said bearing.

11. A navigational aid system as set forth in claim 10, further including operator input means coupled to said data processing means for entering operator data descriptive of the position of said craft, and said data processing means including means for determining said bearing using said operator data.

12. A navigational aid system as set forth in claim 2, wherein said plural means for determining the status of respectively different external physical conditions includes position determining means for establishing the current location of the craft within an area of the surface of the earth as first output data;
  data storage means containing digital data representative of a chosen bearing for the craft to travel and a chosen duration of time;
  said data processing means being also operably coupled to said data storage means and being responsive to said first output data indicative of the current location of the craft and to said digital data representative of said chosen bearing and said chosen duration of time from said data storage means for providing as part of said combined correlated output data, output data representative of said chosen bearing for the craft to travel along and said chosen duration of time; and
  autopilot control means operably connected to said data processing means and adapted to be connected to the steering mechanism of the craft, said autopilot control means being responsive to said output data representative of said chosen bearing and said chosen duration of time from said data processing means for regulating the steering mechanism of the craft to direct the craft to travel along said chosen bearing for said chosen duration of time.

13. A navigational aid system as set forth in claim 12, wherein said data processing means is responsive to said surface characteristics representation means for determining if said chosen bearing will cause the craft to enter into an obstruction-incident area according to the surface characteristics representation thereof, and said data processing means including means for redetermining said chosen bearing to provide a substitute bearing should the original chosen bearing be subject to an obstruction-incident area.

14. A navigational aid system as set forth in claim 2, wherein said plural means for determining the status of respectively different external physical conditions includes position determining means.

15. A navigational aid system as set forth in claim 14, wherein said position determining means comprises a Loran-C receiver.

16. A navigational aid system as set forth in claim 14, wherein said plural means for determining the status of respectively different external physical conditions includes means for transmission and receipt of radio waves.

17. A navigational aid system as set forth in claim 16, wherein said plural means for determining the status of respectively different external physical conditions includes radar means.

18. A navigational aid system as set forth in claim 17, wherein said plural means for determining the status of respectively different external physical conditions includes a sonar device.

19. A navigational aid system as set forth in claim 18, wherein said plural means for determining the status of respectively different external physical conditions includes a radio teletype.

20. A navigational aid system as set forth in claim 19, wherein said plural means for determining the status of respectively different internal physical states of the craft includes a fuel flow sensor.

21. A navigational aid system as set forth in claim 20, wherein said plural means for determining the status of respectively different internal physical states of the craft includes means for sensing a dangerous condition.

* * * * *